(12) United States Patent
Turnquist et al.

(10) Patent No.: US 11,767,681 B2
(45) Date of Patent: Sep. 26, 2023

(54) CONCENTRIC METAL AND CEMENTITIOUS WIND TURBINE TOWER STRUCTURE AND METHOD OF MANUFACTURING SAME

(71) Applicant: General Electric Company, Schenectady, NY (US)

(72) Inventors: Norman Arnold Turnquist, Carlisle, NY (US); Gregory Edward Cooper, Greenfield Center, NY (US)

(73) Assignee: General Electric Company, Schenectady, NY (US)

(*) Notice: Subject to any disclaimer, the term of this patent is extended or adjusted under 35 U.S.C. 154(b) by 39 days.

(21) Appl. No.: 17/278,851

(22) PCT Filed: Sep. 28, 2018

(86) PCT No.: PCT/US2018/053448
§ 371 (c)(1),
(2) Date: Mar. 23, 2021

(87) PCT Pub. No.: WO2020/068117
PCT Pub. Date: Apr. 2, 2020

(65) Prior Publication Data
US 2022/0034115 A1 Feb. 3, 2022

(51) Int. Cl.
*E04H 12/12* (2006.01)
*F03D 13/20* (2016.01)
*E04H 12/34* (2006.01)

(52) U.S. Cl.
CPC ............ *E04H 12/12* (2013.01); *E04H 12/342* (2013.01); *F03D 13/20* (2016.05); *F05B 2230/50* (2013.01); *F05B 2240/912* (2013.01)

(58) Field of Classification Search
CPC ....... F03D 13/20; E04H 12/12; E04H 12/342; F05B 2230/31; F05B 2230/50; F05B 2240/912
See application file for complete search history.

(56) References Cited

U.S. PATENT DOCUMENTS

| 6,705,058 B1 | 3/2004 | Foust et al. |
| 8,516,774 B2 | 8/2013 | Zavitz et al. |

(Continued)

FOREIGN PATENT DOCUMENTS

| CN | 104595127 A | 5/2015 |
| CN | 104712504 A | 6/2015 |

(Continued)

OTHER PUBLICATIONS

PCT International Search Report & Opinion Corresponding to PCT/US2018/053448 dated Jun. 24, 2019.

(Continued)

*Primary Examiner* — Andrew J Triggs
(74) *Attorney, Agent, or Firm* — Dority & Manning, P.A.

(57) ABSTRACT

A tower structure of a wind turbine includes a plurality of tower sections stacked atop each other in an end-to-end configuration along a vertical axis to form the tower structure of the wind turbine at a wind turbine site. Each of the tower sections is formed of at least one first tubular portion and at least one second tubular portion. Further, the first and second tubular portions of each of the plurality of tower sections are concentric with each other. Moreover, the first tubular portion is formed at least in part, of a cementitious material and the second tubular portion is formed of a perforated material having a plurality of holes.

15 Claims, 10 Drawing Sheets

(56) References Cited

U.S. PATENT DOCUMENTS

| | | | |
|---|---|---|---|
| 9,657,722 B2* | 5/2017 | Wagner | E04H 12/12 |
| 9,677,273 B2 | 6/2017 | Abbas et al. | |
| 11,319,930 B2* | 5/2022 | Petersen | F03D 13/20 |
| 2012/0159785 A1 | 6/2012 | Pyles et al. | |
| 2014/0157715 A1 | 6/2014 | Wagner | |
| 2015/0361958 A1* | 12/2015 | Wood | F03D 13/20 |
| | | | 416/1 |
| 2017/0016244 A1 | 1/2017 | Keller et al. | |
| 2017/0365365 A1 | 12/2017 | White et al. | |
| 2022/0034115 A1* | 2/2022 | Turnquist | F03D 13/20 |

FOREIGN PATENT DOCUMENTS

| | | |
|---|---|---|
| CN | 103573006 B | 12/2015 |
| CN | 106460401 A | 2/2017 |
| DE | 19832921 A1 | 2/2000 |
| DE | 102011107804 A1 | 1/2013 |
| EP | 1624137 A1 | 2/2006 |
| EP | 2647782 A1 | 10/2013 |

OTHER PUBLICATIONS

Han et al., Design Feasibility of Double-Skinned Composite Tubular Wind Turbine Tower, The 2015 World Congress on Advances in Civil, Environmental, and Materials Research, vol. 680, 2014, pp. 551-556.

Kong et al., Finite Elements Analysis of Concrete Filled Double Skin Steel Tubes for Wind Turbine Tower, Applied Mechanics and Materials, vol. 680, 2014, pp. 551-556. https://doi.org/10.4028/www.scientific.net/AMM.680.551.

Wang et al., Finite Element Analysis for the Mechanical Behaviors of Circle-Ended Concrete-Filled Steel Tubular Tower, 2009 Second International Conference on Information and Computing Science, Manchester, pp. 110-113.

Wang et al., Design of Lattice Wind Turbine Tower Using Concrete-Filled Steel Tube, Chinese Core Journal of Science and Technology, vol. 37, Issue 3, May 2015, pp. 253-259.

First Examination Report for IN application No. 202117012718, dated Sep. 15, 2022.

EPO Communication pursuant to Article 94(3) for EP application No. 18788971.2 dated Apr. 13, 2023, 5 pages.

* cited by examiner

CONCENTRIC METAL AND CEMENTITIOUS WIND TURBINE TOWER STRUCTURE AND METHOD OF MANUFACTURING SAME

FIELD

The present disclosure relates in general to wind turbine towers, and more particularly to concentric metal and cementitious wind turbine tower structures and methods of manufacturing same.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Tall wind turbine towers are generally constructed from steel tube sections, concrete rings, or a hybrid design that combines a concrete bottom section with a steel tube top. The steel tubes and/or concrete sections are typically formed off-site, shipped on-site, and then arranged together to erect the tower. For example, one manufacturing method includes forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting. Such methods, however, require extensive labor and can be time-consuming.

In addition, the steel tubes are subject to buckling concerns and are limited in wall thickness due to weldability concerns, while the concrete sections must be pre-stressed or post-tensioned to overcome concrete's inherent lack of tensile strength.

Accordingly, the present disclosure is directed to methods for manufacturing wind turbine tower structures that address the aforementioned issues. In particular, the present disclosure is directed to a concentric metal and cementitious wind turbine tower structure that combines the tensile strength of the steel, composite, or otherwise high-tensile-strength tube and the compressive strength/buckling resistance of inexpensive cementitious material and methods of manufacturing same.

BRIEF DESCRIPTION

Aspects and advantages of the invention will be set forth in part in the following description, or may be obvious from the description, or may be learned through practice of the invention.

In one aspect, the present disclosure is directed to a tower structure of a wind turbine. The tower structure includes at least one tower section extending from a foundation along a vertical axis to form the tower structure of the wind turbine at a wind turbine site. The tower section(s) is formed of at least one first tubular portion and at least one second tubular portion. Further, the first and second tubular portions of each of the plurality of tower sections are concentric with each other. Moreover, the first tubular portion is formed at least in part, of a cementitious material (such as concrete) and the second tubular portion is formed of a perforated material having a plurality of holes.

In one embodiment, the tower structure may include a plurality of tower sections stacked atop each other in an end-to-end configuration along the vertical axis. In another embodiment, the tower section(s) may include the second tubular portion being arranged within the first tubular portion. Alternatively, the tower section(s) may include the first tubular portion being arranged within the second tubular portion.

In further embodiments, the tower section(s) may include a plurality of first tubular portions. In such embodiments, the tower section(s) may include the second tubular portion being sandwiched between two first tubular portions.

In further embodiments, the tower section(s) may include a plurality of second tubular portions. In such embodiments, the tower section(s) may include the first tubular portion being sandwiched between two second tubular portions.

In additional embodiments, the second tubular portion may be formed of at least one of solid wall or a perforated wall. In further embodiments, the first tubular portion may be formed via at least one of spray deposition, casting, or additive manufacturing. In several embodiments, the cementitious material may at least partially fill the plurality of holes of the perforated material. Further, the cementitious material may be additively printed to the second tubular portion. In addition, the perforated material may be constructed of a metal, a metal alloy, a composite material, or any other suitable high-tensile-strength material.

In another aspect, the present disclosure is directed to a method for manufacturing a tower structure of a wind turbine. The method includes forming a plurality of tower sections each having at least one first tubular portion formed of a cementitious material and at least one second tubular portion formed of a perforated material having a plurality of holes. Further, the first and second tubular portions are concentric with each other. The method also includes stacking the plurality of tower sections in an end-to-end configuration along a vertical axis to form the tower structure of the wind turbine at a wind turbine site.

In one embodiment, forming the plurality of tower sections may include separately forming the second tubular portion of the perforated material and additively printing the cementitious material to at least one of an inner surface or an outer surface of the second tubular portion to form the first tubular portion.

In another embodiment, forming the plurality of tower sections may include forming the second tubular portion and spraying the cementitious material to at least one of an inner surface or an outer surface of the second tubular portion to form the first tubular portion. In further embodiments, the method may include allowing the cementitious material to at least partially fill the plurality of holes of the perforated material.

In additional embodiments, forming the plurality of tower sections may include forming a plurality of the second tubular portions, arranging the plurality of second tubular portions concentrically with each other with a gap defined therebetween, and filling the gap with the cementitious material to form the first tubular portion. In similar embodiments, forming the plurality of tower sections may include forming a plurality of the first tubular portions, arranging the plurality of first tubular portions concentrically with each other with a gap defined therebetween, and inserting the perforated material into the gap to form the second tubular portion.

In another embodiment, the method may include forming the first tubular portion using at least one of spray deposition, casting, or additive manufacturing. In further embodiments, the method may include forming the second tubular portion using at least one of welding, spiral welding, or additive manufacturing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to concentric metal and cementitious wind turbine tower structures and methods of manufacturing same. In certain embodiments, such manufacturing methods may use automated deposition of cementitious materials via technologies such as additive manufacturing, 3-D Printing, spray deposition, extrusion additive manufacturing, concrete printing, automated fiber deposition, as well as other techniques that utilize computer numeric control and multiple degrees of freedom to deposit material. More specifically, the present disclosure combines concentric tubes of metal (such as steel) and cementitious material (such as concrete) to enable a thinner steel wall (for easier and faster welding) and cementitious material as the primary load-bearing material.

In certain embodiments, the steel, composite, or otherwise high-tensile-strength tube(s) may be manufactured using conventional rolling methods or using a spiral-weld process common in the fabrication of large pipes. Further, the cementitious material may be poured into a space between two concentric thin-walled tubes, or could be additively deposited on the inner or outer surfaces of a steel, composite, or otherwise high-tensile-strength tube. As such, the tower structures of the present disclosure provide a cost-effective design solution that combines the tensile strength of the steel, composite, or otherwise high-tensile-strength tube and the compressive strength/buckling resistance of inexpensive concrete.

Figure 1:
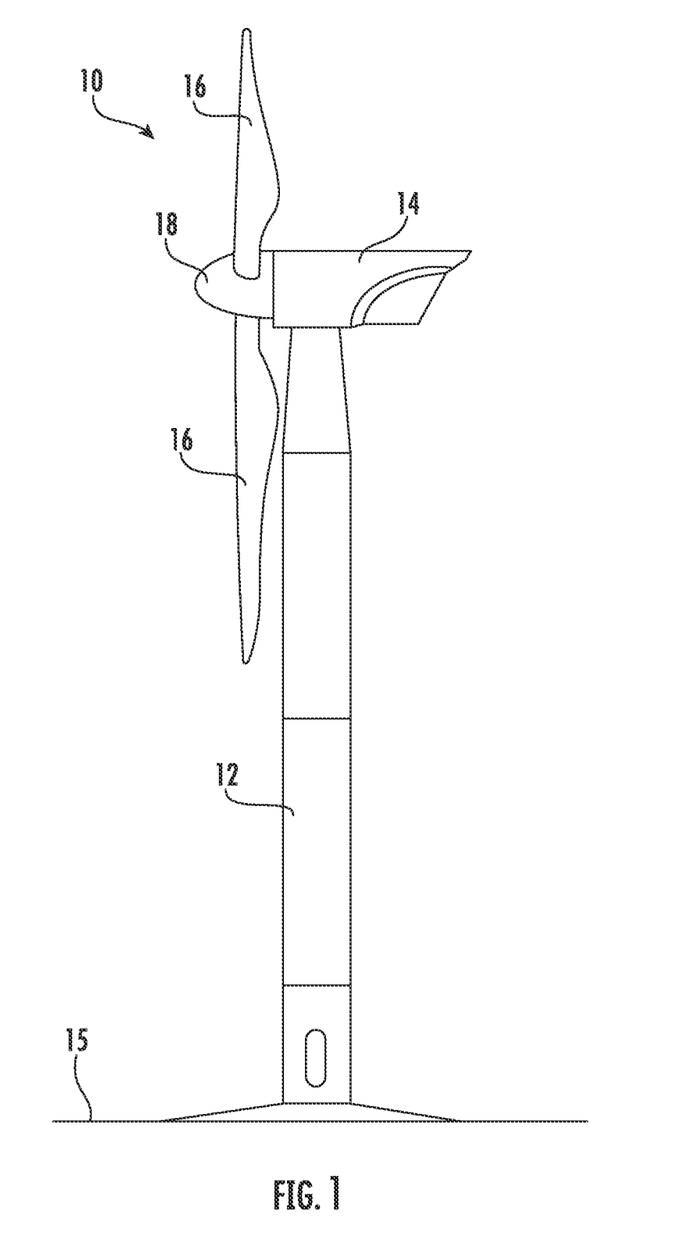
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers, but may be utilized in any application having concrete constructions and/or tall towers in addition to wind towers, including for example homes, bridges, tall towers and other aspects of the concrete industry. Further, the methods described herein may also apply to manufacturing any similar structure that benefits from the advantages described herein.

Figure 2:
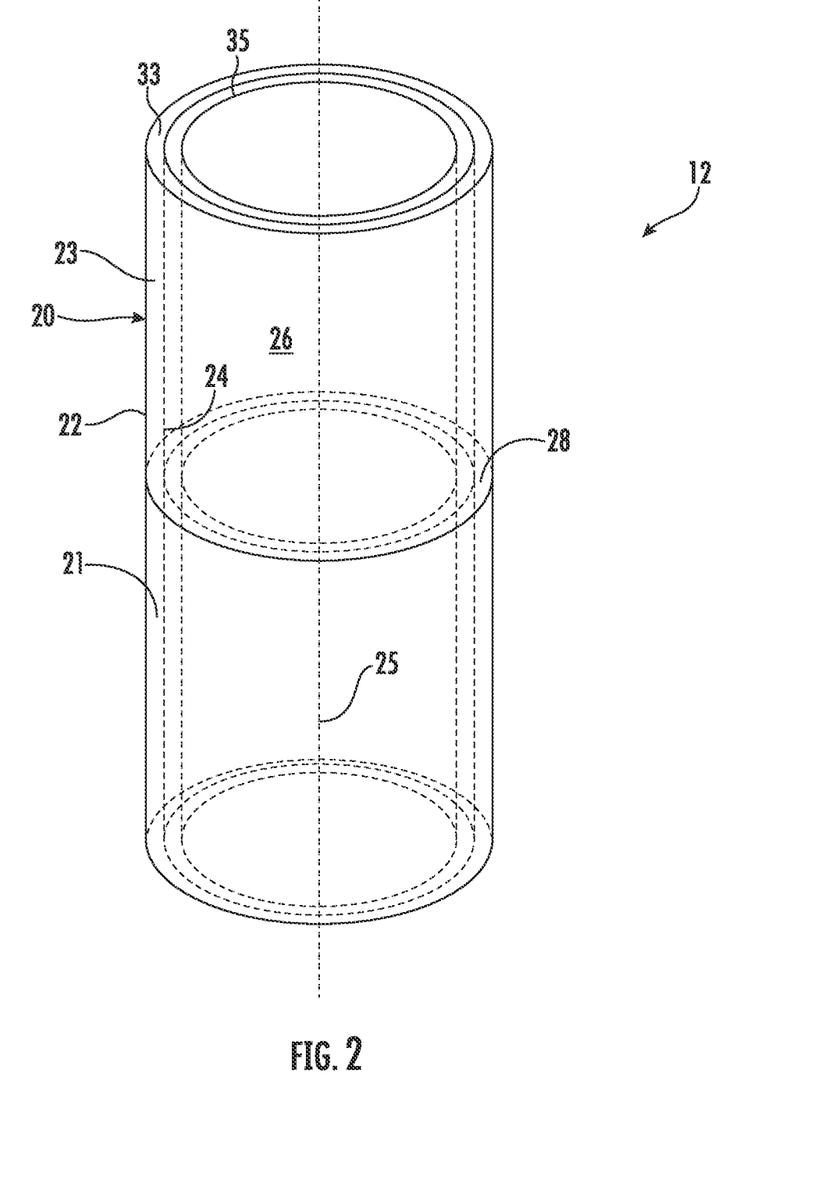
FIG. 2 illustrates a perspective view of one embodiment of a tower structure of a wind turbine according to the present disclosure.

Referring now to FIG. 2, a perspective view of one embodiment of a tower structure 12 of a wind turbine 10 according to the present disclosure is illustrated. As shown, the illustrated tower 12 includes a plurality of tower sections 21, 23 stacked atop each other in an end-to-end configuration along a vertical axis 25 to form the tower structure 12 of the wind turbine 10. Further, as shown, the tower structure 12 defines a circumferential tower wall 20 having an outer surface 22 and an inner surface 24. Further, as shown, the circumferential tower wall 20 generally defines a hollow interior 26 that is commonly used to house various turbine components (e.g. a power converter, transformer, etc.). In addition, as will be described in more detail below, the tower structure 12 may be formed, at least in part, using additive manufacturing. Moreover, as shown, each of the tower sections 21, 23 of the tower structure 12 may be formed, at least in part, of a cementitious material 28 that is reinforced with a perforated material 30, which is described in more detail below.

As used herein, the cementitious material described herein may include any suitable workable paste that is configured to bind together after curing to form a structure. As examples, a cementitious material may include lime or calcium silicate based hydraulically setting materials such as Portland cement, fly ash, blast furnace slag, pozzolan, limestone fines, gypsum, or silica fume, as well as combinations of these. In some embodiments, the cementitious material 28 may additionally or alternatively include non-hydraulic setting material, such as slaked lime and/or other materials that harden through carbonation. Cementitious materials may be combined with fine aggregate (e.g., sand) to form mortar, or with rough aggregate (sand and gravel) to form concrete. A cementitious material may be provided in the form of a slurry, which may be formed by combining any one or more cementitious materials with water, as well as other known additives, including accelerators, retarders, extenders, weighting agents, dispersants, fluid-loss control agents, lost-circulation agents, strength-retrogression prevention agents, free-water/free-fluid control agents, expansion agents, plasticizers (e.g., superplasticizers such as polycarboxylate superplasticizer or polynaphthalene sulfonate superplasticizer), and so forth. The relative amounts of respective materials to be provided in a cementitious material may be varied in any manner to obtain a desired effect. The perforated material 30, as used herein, may be formed using any suitable metal or metal alloy (such as steel), non-metallic materials (such as composite), or any other suitable material similar.

Referring now to FIGS. 3-6, various cross-sectional views of the tower structure 12 are provided. More particularly, FIGS. 3-6, illustrates various tower structures that combine concentric metal tubular portions and cementitious tubular portions to enable a thinner metal wall (i.e. for easier and/or faster welding) with the cementitious portions being the primary load-bearing material. For example, as shown generally in FIGS. 3-6, each of the tower sections 21, 23 is formed of at least one first tubular portion 33 and at least one second tubular portion 35. Further, as shown, the first and second tubular portions 33, 35 of each of the plurality of tower sections 21, 23 are concentric with each other. Moreover, the first tubular portion 33 may be formed at least in part, of the cementitious material 28 (such as concrete), whereas the second tubular portion 35 may be formed, at least in part, of the perforated material 30 (such as steel), non-metallic materials (such as composite), or similar.

Figure 3:
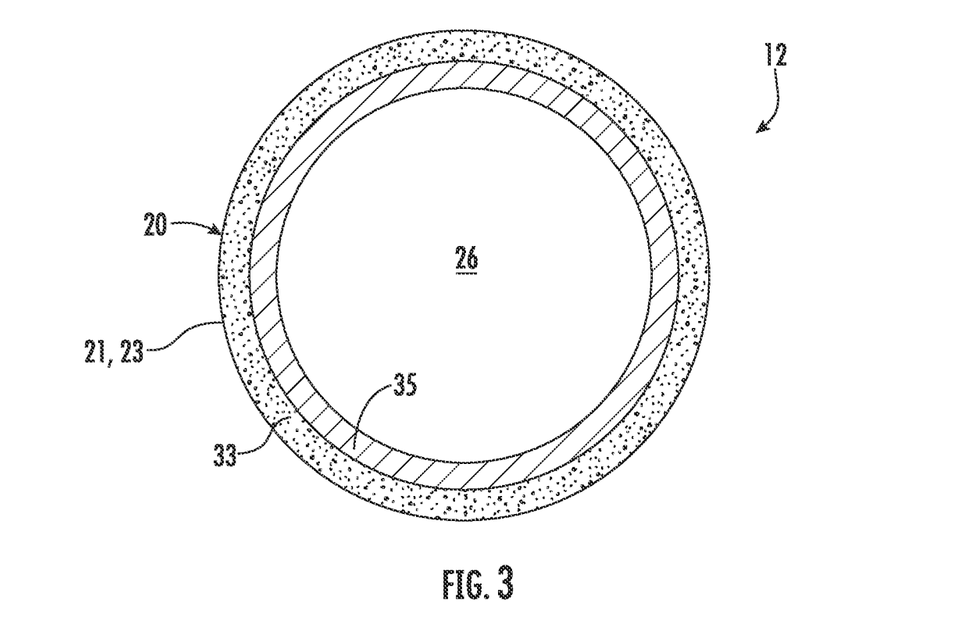
FIG. 3 illustrates a cross-sectional view of one embodiment of a tower structure of a wind turbine according to the present disclosure.
Figure 4:
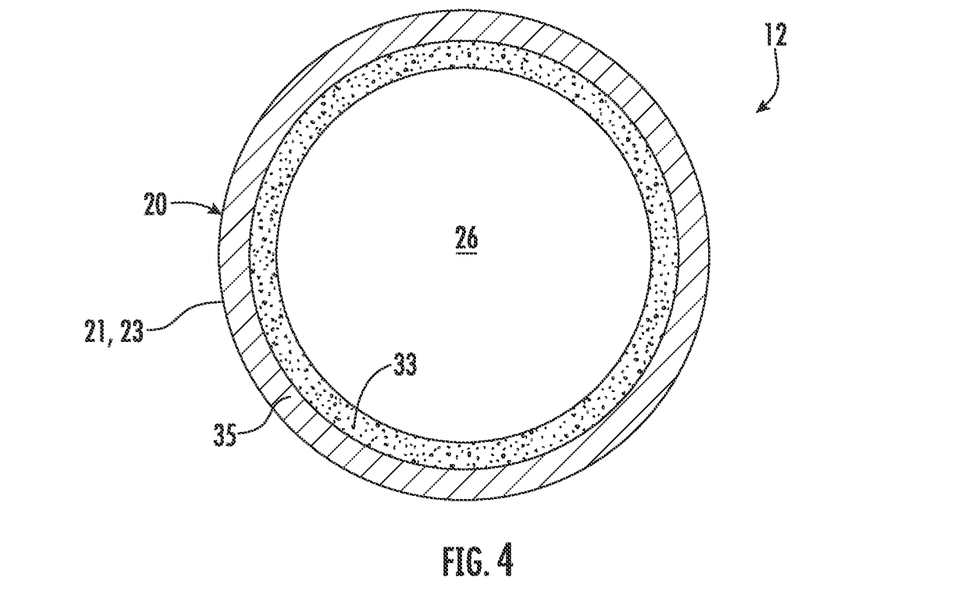
FIG. 4 illustrates a cross-sectional view of another embodiment of a tower structure of a wind turbine according to the present disclosure.
Figure 5:
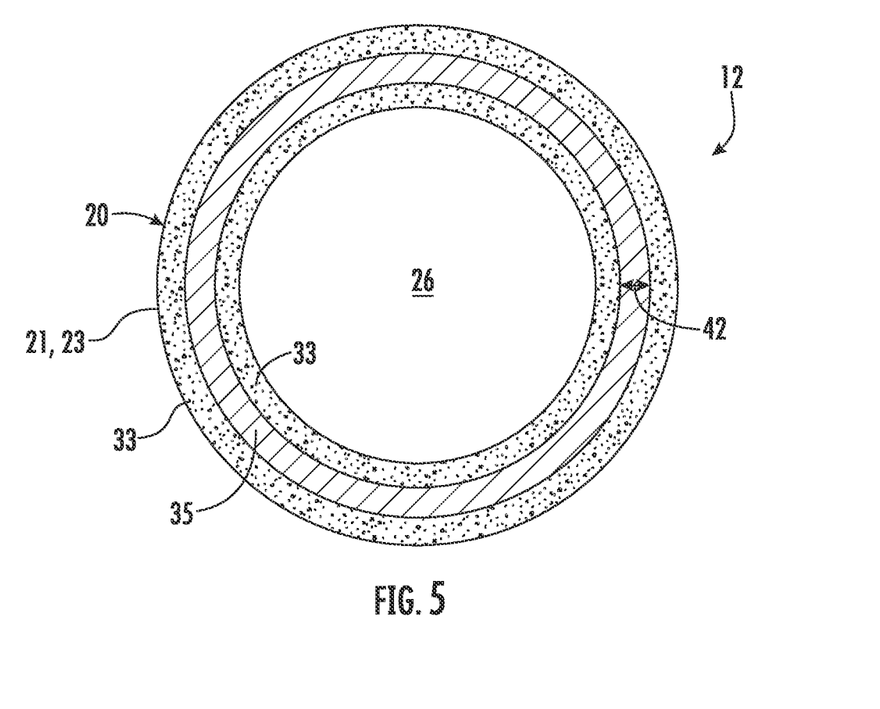
FIG. 5 illustrates a cross-sectional view of still another embodiment of a tower structure of a wind turbine according to the present disclosure.
Figure 6:
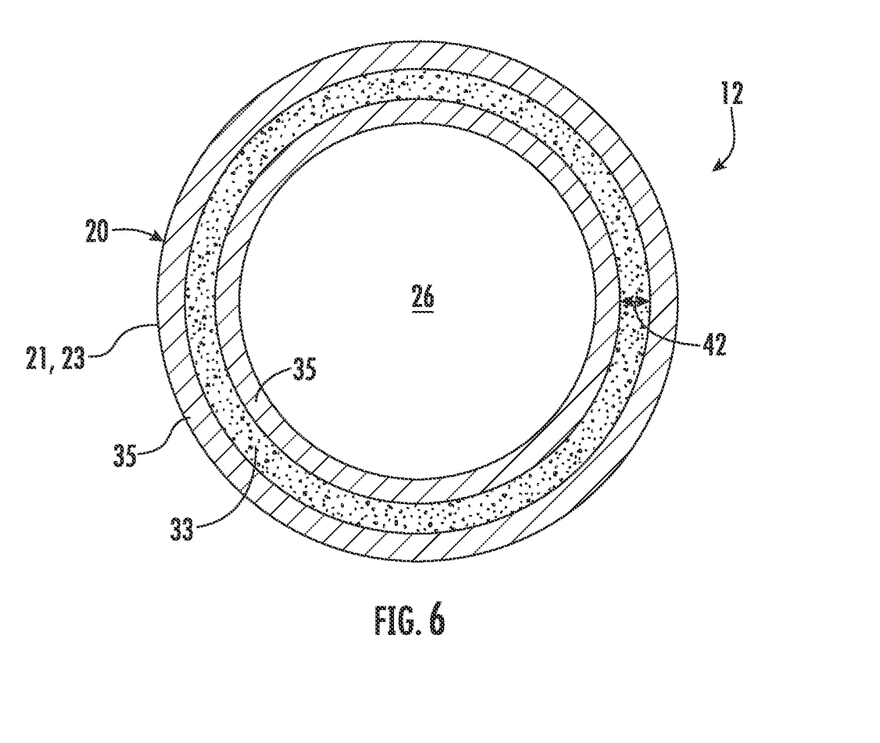
FIG. 6 illustrates a cross-sectional view of yet another embodiment of a tower structure of a wind turbine according to the present disclosure.

Referring particularly to FIG. 3, at least one of the tower sections 21, 23 may include the second tubular portion 35 being arranged within the first tubular portion 33. Alternatively, as shown in FIG. 4, at least one of the tower sections 21, 23 may include the first tubular portion 33 being arranged within the second tubular portion 35. Referring now to FIG. 5, in several embodiments, at least one of the tower sections 21, 23 may include a plurality of first tubular portions 33. In such embodiments, at least one of the tower sections 21, 23 may include the second tubular portion 35 being sandwiched between two first tubular portions. Alternatively, in further embodiments, as shown in FIG. 6, at least one of the tower sections 21, 23 may include a plurality of second tubular portions 35. In such embodiments, as shown, at least one of the tower sections 21, 23 may include the first tubular portion 33 being sandwiched between two second tubular portions 35.

In additional embodiments, the first tubular portion(s) 33 described herein may be formed via at least one of spray deposition, casting, additive manufacturing, and/or any other suitable manufacturing process. In further embodiments, the second tubular portion(s) 35 described herein may be formed via at least one of welding, spiral welding, additive manufacturing, and/or any other suitable manufacturing process. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers, but are also capable of printing curved and/or irregular shapes.

Figure 7:
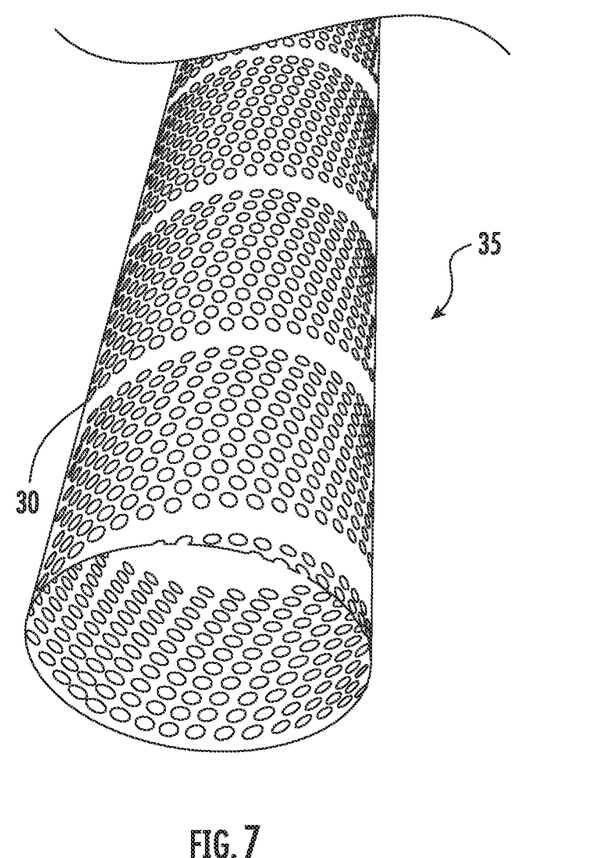
FIG. 7 illustrates a perspective view of one embodiment of a tubular portion of a tower structure of a wind turbine according to the present disclosure.
Figure 8:
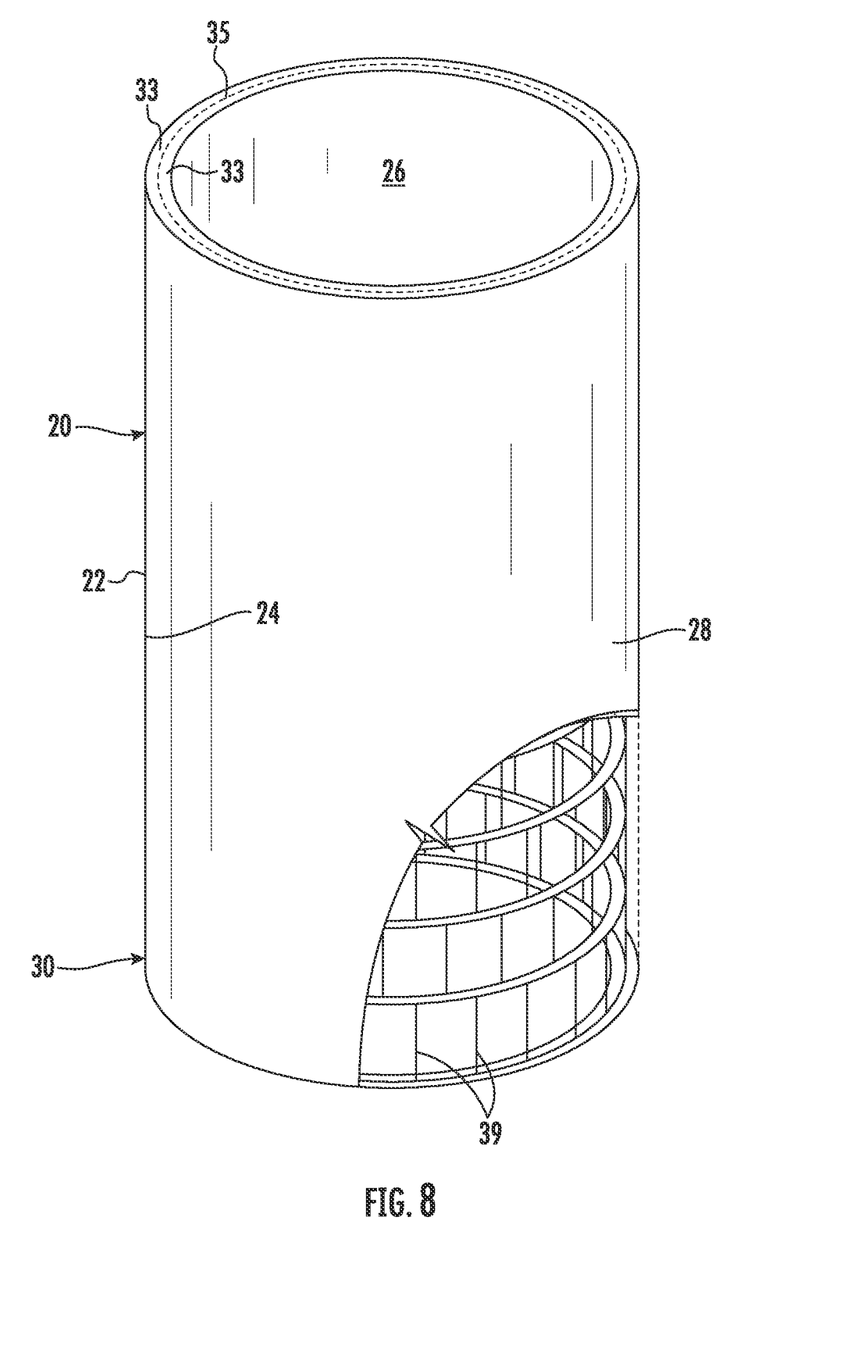
FIG. 8 illustrates a perspective view of another embodiment of a tower structure of a wind turbine according to the present disclosure.

Referring now to FIGS. 7-9, various features of the metal second tubular portion 35 are illustrated. FIG. 7 illustrates a perspective view of one embodiment of the second tubular portion 35 formed of the perforated material 30. FIG. 8 illustrates a perspective cut-away view of one embodiment of the tower structure 12 where the second tubular portion 35 is formed of a plurality of reinforcing bars arranged together to form a metal mesh 39 arranged in a cylindrical configuration to correspond to the shape of the tower 12. Further, as shown, the cylindrical metal mesh 39 can be embedded between two first tubular portions 33. In such embodiments, the tower structure 12 can be formed by shaping the mesh 39 into the desired shape and spraying or printing the cementitious material 28 to both sides of the mesh 39 to provide inner and outer first tubular portions 33 that surround the second tubular portion 35 (which corresponds to the mesh 39). In such embodiments, a temporary backing material may be placed adjacent to the mesh 39 to prevent the cementitious material 28 from spilling into undesired areas. In another embodiment, if the cementitious material 28 is printed to the mesh 39, the cementitious material 28 can be viscous enough to control the flow of the material 28, thereby controlling the dimensions of the finished product.

Figure 9:
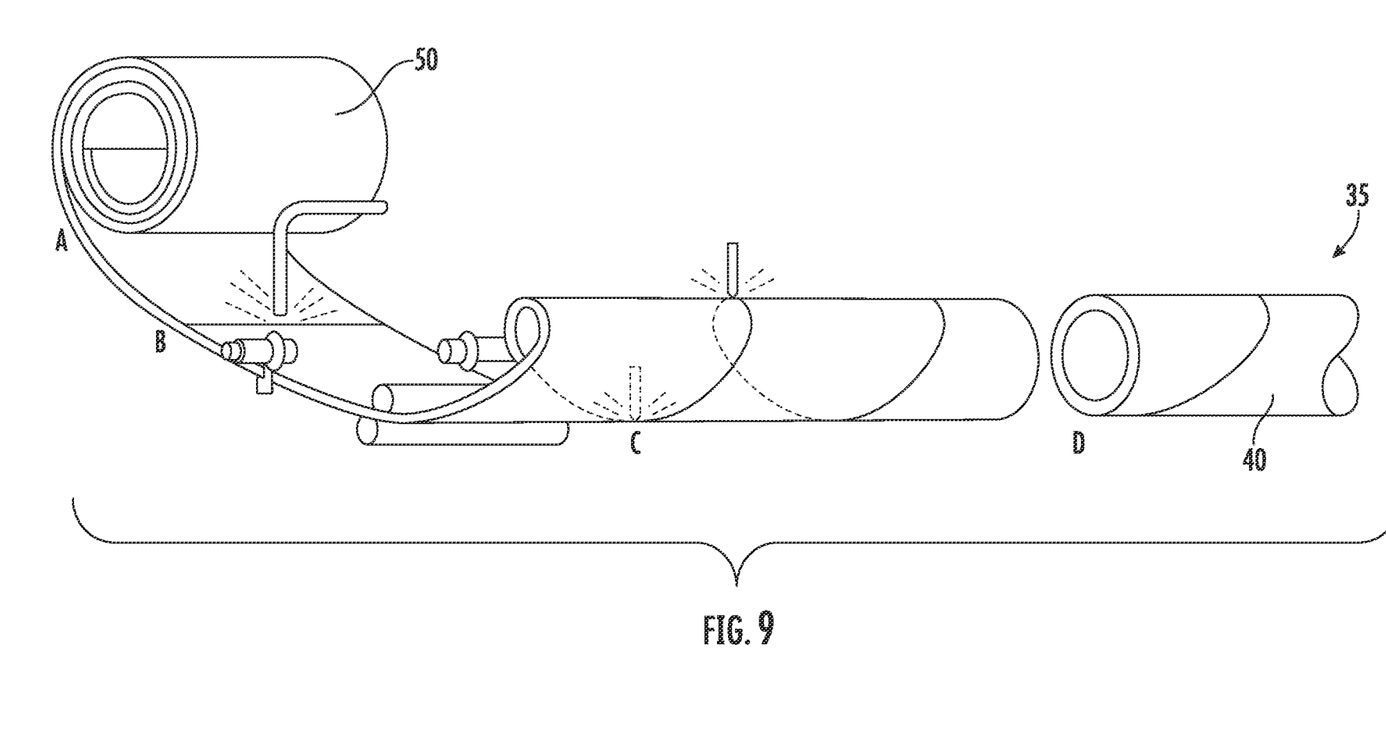
FIG. 9 illustrates a schematic diagram of one embodiment of a spiral welding process for forming a tubular portion of a tower structure of a wind turbine according to the present disclosure.

Alternatively, FIG. 9 illustrates a spiral welding process being used to form one embodiment of the second tubular wall 35. More specifically, as shown, the spiral welding process generally includes a process where a metal material (having either a solid or perforated wall) begins in a coil shape that is hot rolled. Thus, as shown, the hot rolled metal material is then unrolled at (A), trimmed at (B), and end welded into a tubular shape at (C). Further, as shown, the continuous tubular shape is then cooled and cut at (D) to form the second tubular portions 35 described herein, which can be perforated and/or solid.

Figure 10:
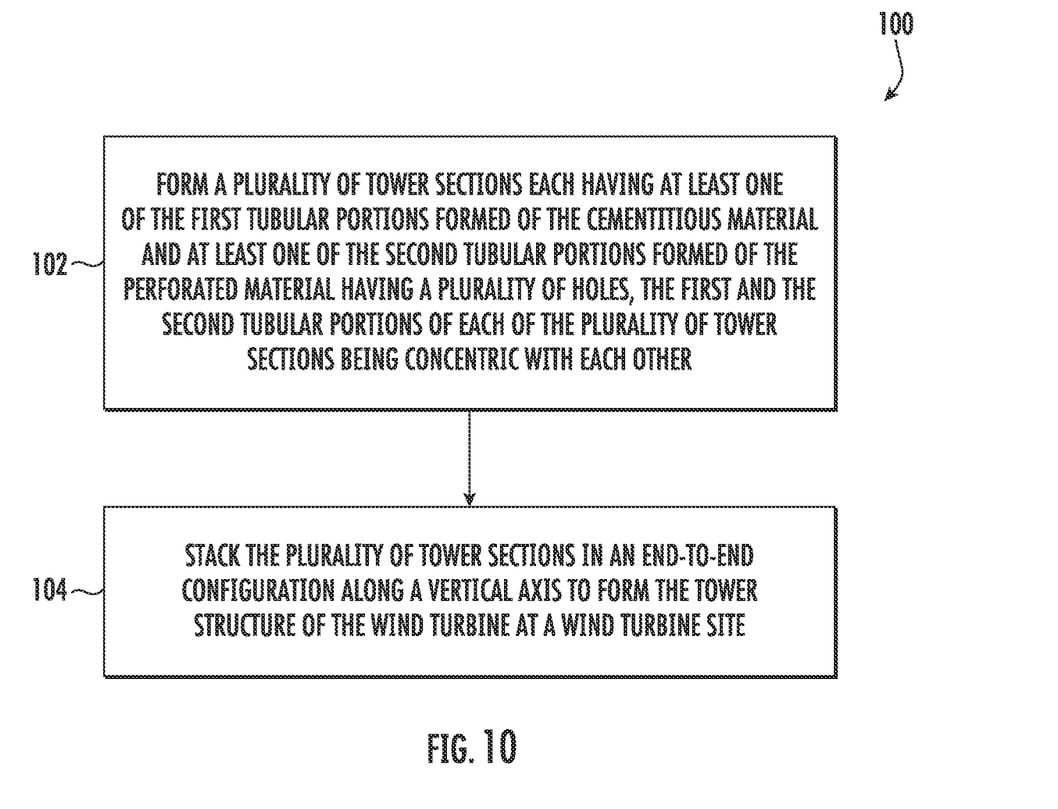
FIG. 10 illustrates a flow diagram of one embodiment of a method for manufacturing a tower structure of a wind turbine according to the present disclosure.

Referring particularly to FIG. 10, a flow diagram of one embodiment of a method 100 for manufacturing a tower structure of a wind turbine at a wind turbine site. In general, the method 100 will be described herein with reference to the wind turbine 10 and the tower structure 12 shown in FIGS. 2-9. However, it should be appreciated that the disclosed method 100 may be implemented with tower structures having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include forming the plurality of tower sections 21, 23 each having at least one of the first tubular portions 33 formed of the cementitious material 28 and at least one of the second tubular portions 35 formed of the perforated material 30 having a plurality of holes 40. Further, the first and second tubular portions 33, 35 of each of the plurality of tower sections 21, 23 are concentric with each other.

For example, in one embodiment, the tower sections 21, 23 may be formed by separately forming the first and second tubular portions 33, 35 and then arranging the second tubular portion 35 within the first tubular portion 33 (as shown in FIG. 3) or vice versa (as shown in FIG. 4). In another embodiment, the tower sections 21, 23 may be formed by first forming the second tubular portion 35 and then additively printing the cementitious material 28 to either or both of the inner or outer surfaces of the second tubular portion 35 to form the first tubular portion 33. In such embodiments, the cementitious material 28 is allowed to pass through the holes 40 of the perforated material 30.

In additional embodiments, as shown in FIG. 6, the tower sections 21, 23 may be formed by forming a plurality of the second tubular portions 35, arranging the plurality of second tubular portions 35 concentrically with each other with a gap 42 defined therebetween, and filling the gap 42 with the cementitious material 28 to form the first tubular portion 33. In similar embodiments, as shown in FIG. 5, the tower sections 21, 23 may be formed by forming a plurality of the first tubular portions 33, arranging the plurality of first tubular portions 33 concentrically with each other with a gap 42 defined therebetween, and inserting the perforated material 30 into the gap 42 to form the second tubular portion 35.

Referring back to FIG. 10, as shown at (104), the method 100 may include stacking the plurality of tower sections 21, 23 in an end-to-end configuration along the vertical axis 25 to form the tower structure 12 of the wind turbine 10, e.g. at a wind turbine site.

Figure 11:
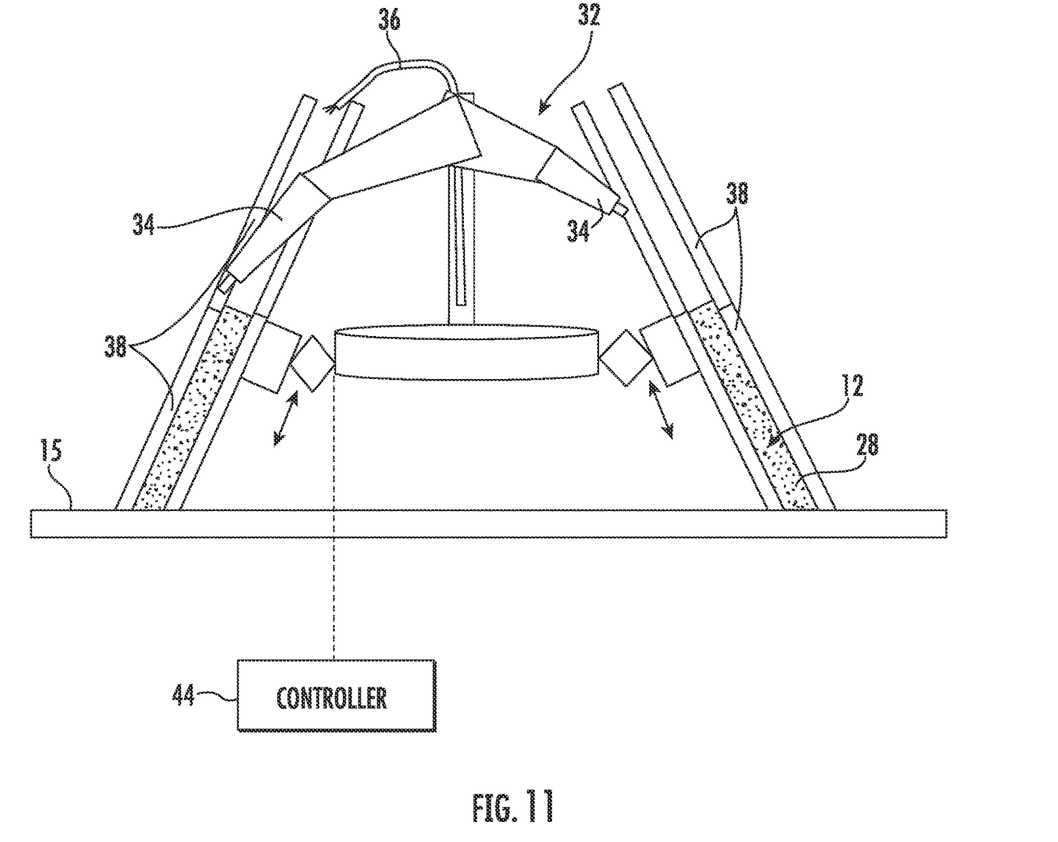
FIG. 11 illustrates a schematic diagram of one embodiment of an additive printing device for manufacturing a tower structure of a wind turbine according to the present disclosure.

Referring now to FIG. 11, the first and second tubular portions 33, 35 may formed at least in part via additive manufacturing. Thus, FIG. 11 illustrates a schematic diagram of one embodiment of an additive printing device 32 according to the present disclosure. It should be understood that the additive printing device 32 described herein generally refers to any suitable additive printing device having one or more nozzles for depositing material onto a surface that is automatically controlled by a controller to form an object programmed within the computer (such as a CAD file). More specifically, as shown, the additive printing device 32 may include one or more nozzles 34 for depositing various materials. For example, as shown in the illustrated embodiment, the additive printing device 32 includes two nozzles 34. In further embodiments, the additive printing device 32 may include any suitable number of nozzles 34. In addition, the additive printing device 32 may include an injector 36, which is discussed in more detail below.

In addition, as shown, the additive printing device 32 may be configured to print the first and second tubular portions 33, 35 into one or more molds 38 of the tower structure 12, e.g. on the foundation 15 of the wind turbine 10. It should be understood that the molds 38 described herein may be solid, porous, and/or printed with openings to inject the various materials described herein. In addition, in one embodiment, the mold(s) 38 may be prefabricated and delivered to the wind turbine site. In alternative embodiments, the additive printing device 32 may also be configured to print the mold(s) 38 of the tower structure 12 on-site. For example, as shown, one of the nozzles 34 may be configured to dispense a polymer material for building up the mold(s) 38 on the foundation 15 of the wind turbine 10 (or any other suitable on-site location). Suitable polymer materials may include, for example, a thermoset material, a thermoplastic material, a biodegradable polymer (such as a corn-based polymer system, fungal-like additive material, or an algae-based polymer system) that is configured to degrade/dissolve over time, or combinations thereof. As such, in one embodiment, the outer polymer mold may be biodegradable over time, whereas the inner polymer mold remains intact. In alternative embodiments, the outer and inner molds may be constructed of the same material.

In such embodiments, as shown, the additive printing device 32 may be configured to fill the mold(s) 38 of the tower structure 12 with the cementitious and/or metal materials 28, 30 to form the first and second tubular portions 33, 35. Further, the mold(s) 38 may be sized such that after the first and second tubular portions 33, 35 are formed, they fit concentrically together. More specifically, as shown, one or more of the nozzles 34 may be configured to print the cementitious and/or metal materials 28, 30 into the molds 38. In alternative embodiments, rather than printing the cementitious material 28, the injector 36 of the additive printing device 32 may simply inject or fill the mold(s) 38 with the cementitious material 28, e.g. by injecting the cementitious material 28 from the top of the molds 38 or by injecting the cementitious material 28 through openings in the mold.

In additional embodiments, an adhesive material may also be provided between one or more of the cementitious material 28 and the foundation 15 and/or multiple layers of the cementitious material 28, the polymer material, and/or the metal material. Thus, the adhesive material may further supplement interlayer bonding between materials.

The adhesive material described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC". Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Exemplary polymeric materials that may be utilized in an adhesive formulation include may include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of exemplary polymeric materials are described in ASTM C1059/C1059M-13, Standard Specification for Latex Agents for Bonding Fresh To Hardened Concrete.

In alternative embodiments, wherein the second tubular portion 35 is formed via a mesh 39, the method 100 may include spraying the cementitious material 28 onto the mesh to form the tower wall 20. The cementitious material 28 may also be similarly deposited additively against the inner and/or outer surfaces of the second tubular portion 35 (which may be smooth or perforated) to form the tower wall 20. In yet another embodiment, thin-walled metal tubes may be concentrically assembled (i.e. via welding or printing) with the additive printing device 32 filling the space between the metal tubes with the cementitious material 28 (i.e. via pouring/casting or printing).

Figure 12:
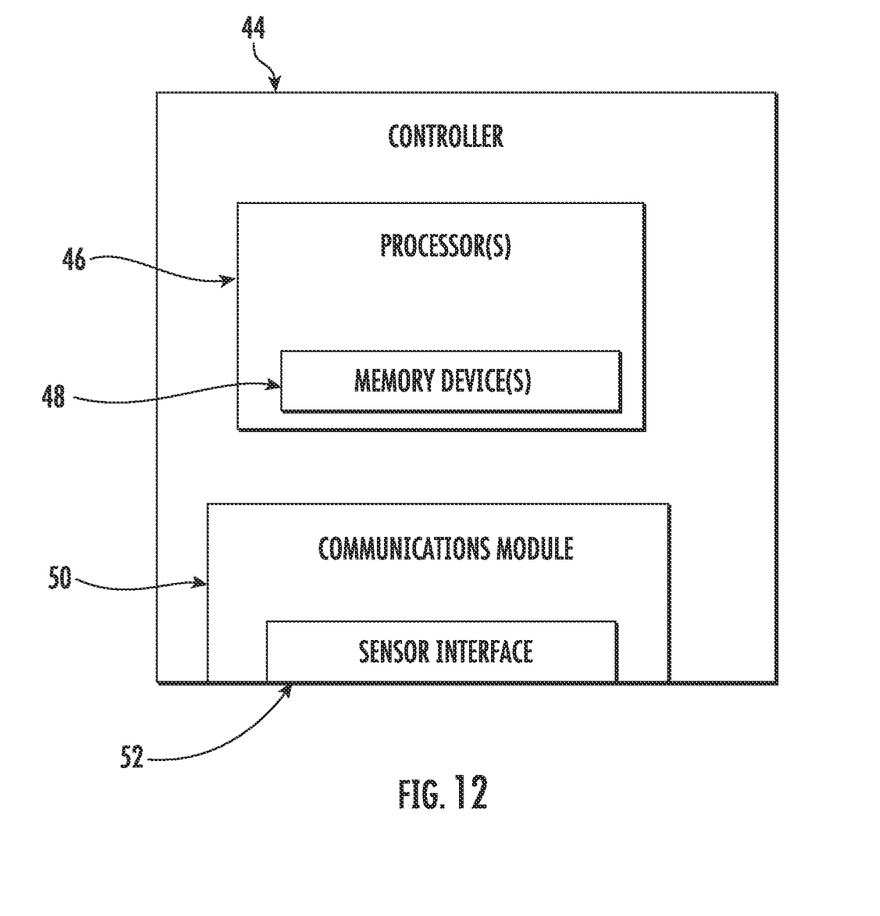
FIG. 12 illustrates a block diagram of one embodiment of a controller of an additive printing device according to the present disclosure.

Referring now to FIG. 12, a block diagram of one embodiment of the controller 44 of the additive printing device 32 is illustrated. As shown, the controller 44 may include one or more processor(s) 46 and associated memory device(s) 48 configured to perform a variety of computer-implemented functions (e.g., performing the methods, steps, calculations and the like and storing relevant data as disclosed herein). Additionally, the controller 44 may also include a communications module 50 to facilitate communications between the controller 44 and the various components of the additive printing device 32. Further, the communications module 50 may include a sensor interface 52 (e.g., one or more analog-to-digital converters) to permit signals transmitted from one or more optional sensors (not shown) to be converted into signals that can be understood and processed by the processors 46. It should be appreciated that the sensors may be communicatively coupled to the communications module 50 using any suitable means, including a wired connection and a wireless connection.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 46 is also configured to compute advanced control algorithms and communicate to a variety of Ethernet or serial-based protocols (Modbus, OPC, CAN, etc.). Additionally, the memory device(s) 48 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 48 may generally be configured to store suitable computer-readable instructions that, when implemented by the processor(s) 46, configure the controller 44 to perform the various functions as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower structure of a wind turbine, the tower structure comprising:
   at least one tower section extending from a foundation along a vertical axis to form the tower structure of the wind turbine at a wind turbine site, the at least one tower section formed of at least one first tubular portion and a plurality of second tubular portions, the first tubular portion and the plurality of second tubular portions of the at least one tower section being concentric with each other, the first tubular portion formed at least in part, of a cementitious material, the plurality of second tubular portions formed of a perforated material comprising a plurality of holes, the plurality of holes being adjacent to and contacting the first tubular portion such that the at least one tower section comprises the first tubular portion being sandwiched between two second tubular portions of the plurality of second tubular portions.

2. The tower structure of claim 1, further comprising a plurality of tower sections stacked atop each other in an end-to-end configuration along the vertical axis.

3. The tower structure of claim 1, wherein the at least one tower section comprises a plurality of first tubular portions.

4. The tower structure of claim 1, wherein the plurality of second tubular portion is formed via at least one of welding, spiral welding, or additive manufacturing.

5. The tower structure of claim 1, wherein the cementitious material at least partially fills the plurality of holes of the perforated material.

6. The tower structure of claim 1, wherein the cementitious material is additively printed to the second tubular portion.

7. The tower structure of claim 1, wherein the perforated material is constructed of at least one of a metal, a metal alloy, or a composite material.

8. The tower structure of claim 1, wherein the cementitious material comprises concrete.

9. A method for manufacturing a tower structure of a wind turbine, the method comprising:
   forming a plurality of tower sections each having at least one first tubular portion formed of a cementitious material and a plurality of second tubular portions formed of a perforated material comprising a plurality of holes, the first tubular portion and the plurality of second tubular portions being concentric with each other, the plurality of holes being adjacent to and contacting the first tubular portion such that at least one tower section of the plurality of tower sections comprises the first tubular portion being sandwiched between two second tubular portions of the plurality of second tubular portions; and
   stacking the plurality of tower sections in an end-to-end configuration along a vertical axis to form the tower structure of the wind turbine at a wind turbine site.

10. The method of claim 9, wherein forming the plurality of tower sections further comprises:
    separately forming the plurality of second tubular portions of the perforated material; and,
    additively printing the cementitious material to at least one of an inner surface or an outer surface of the plurality of second tubular portions to form the first tubular portion.

11. The method of claim 9, wherein forming the plurality of tower sections further comprises:
    separately forming the plurality of second tubular portions; and,
    spraying the cementitious material to at least one of an inner surface or an outer surface of the plurality of second tubular portions to form the first tubular portion.

12. The method of claim 9, further comprising allowing the cementitious material to at least partially fill the plurality of holes of the perforated material.

13. The method of claim 9, wherein forming the plurality of tower sections further comprises:
  forming the plurality of the second tubular portions;
  arranging the plurality of second tubular portions concentrically with each other with a gap defined therebetween; and,
  filling the gap with the cementitious material to form the first tubular portion.

14. The method of claim 9, wherein forming the plurality of tower sections further comprises:
  forming a plurality of the first tubular portions;
  arranging the plurality of first tubular portions concentrically with each other with a gap defined therebetween; and,
  inserting the perforated material into the gap to form at least one second tubular portion of the plurality of second tubular portions.

15. The method of claim 9, further comprising forming the first tubular portion using at least one of spray deposition, casting, or additive manufacturing and forming the plurality of second tubular portions using at least one of welding, spiral welding, or additive manufacturing.

\* \* \* \* \*